F. W. R. WILLIAMS.
APPARATUS FOR USE IN THE MANUFACTURE OF SUPERPHOSPHATE.
APPLICATION FILED FEB. 4, 1919.
1,398,350.
Patented Nov. 29, 1921.
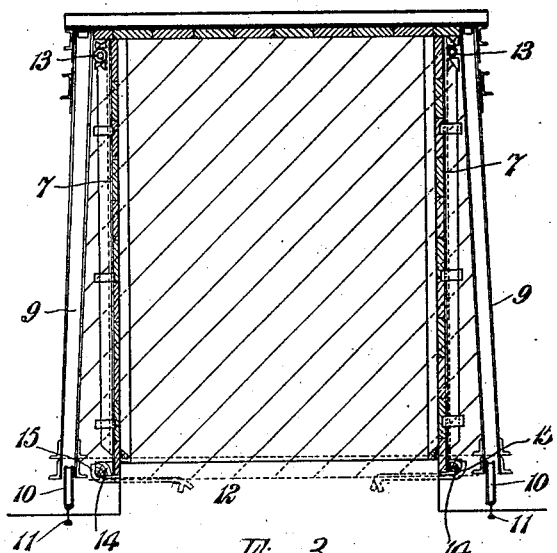
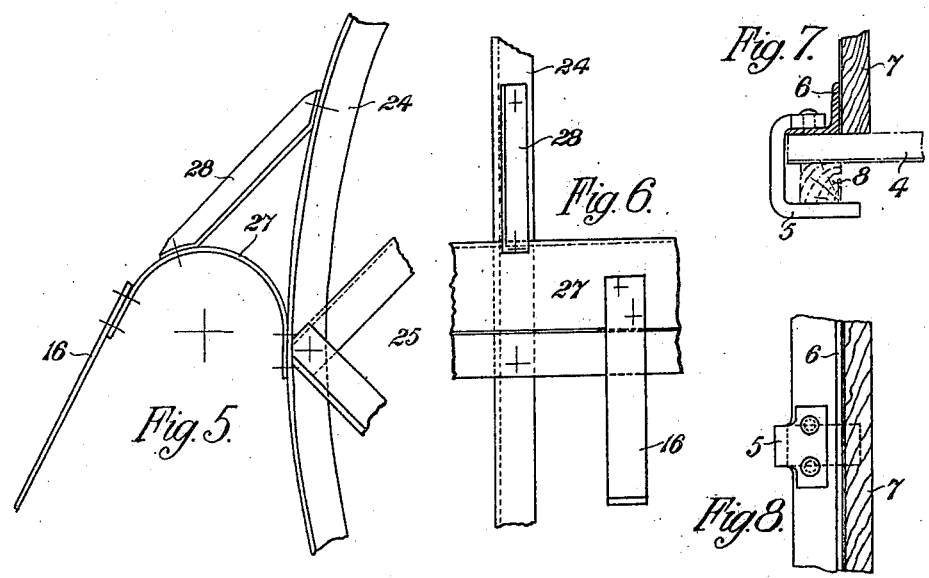

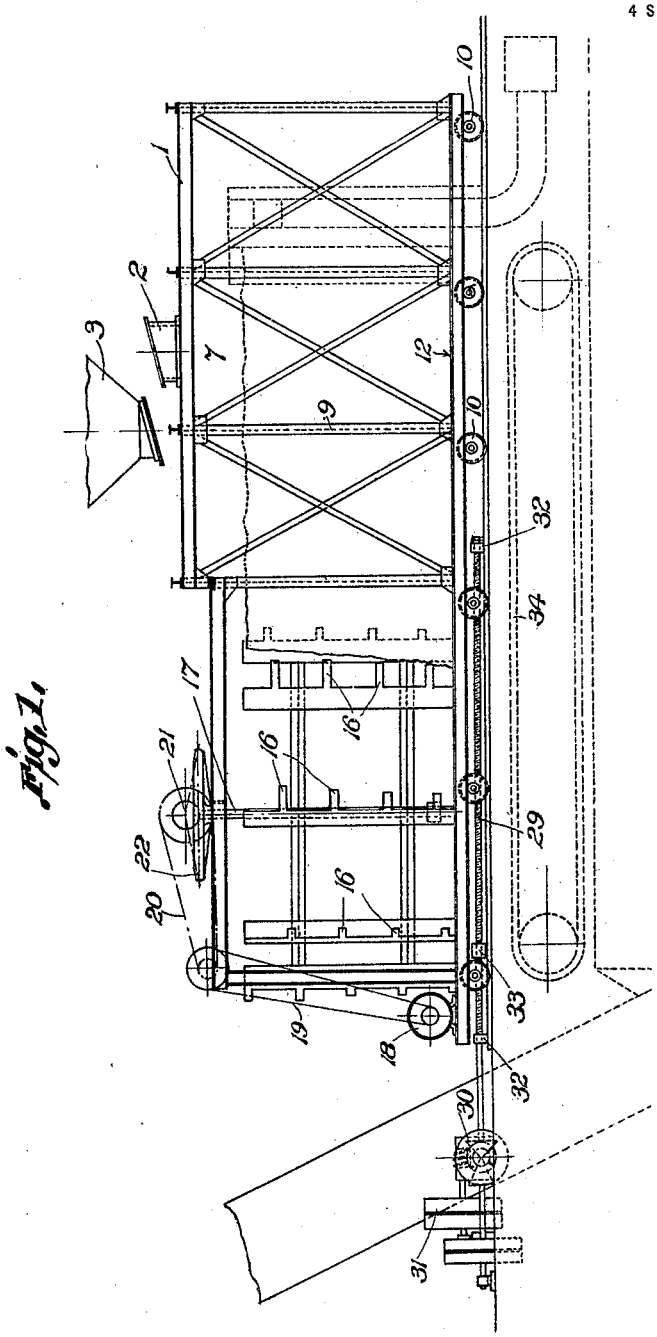

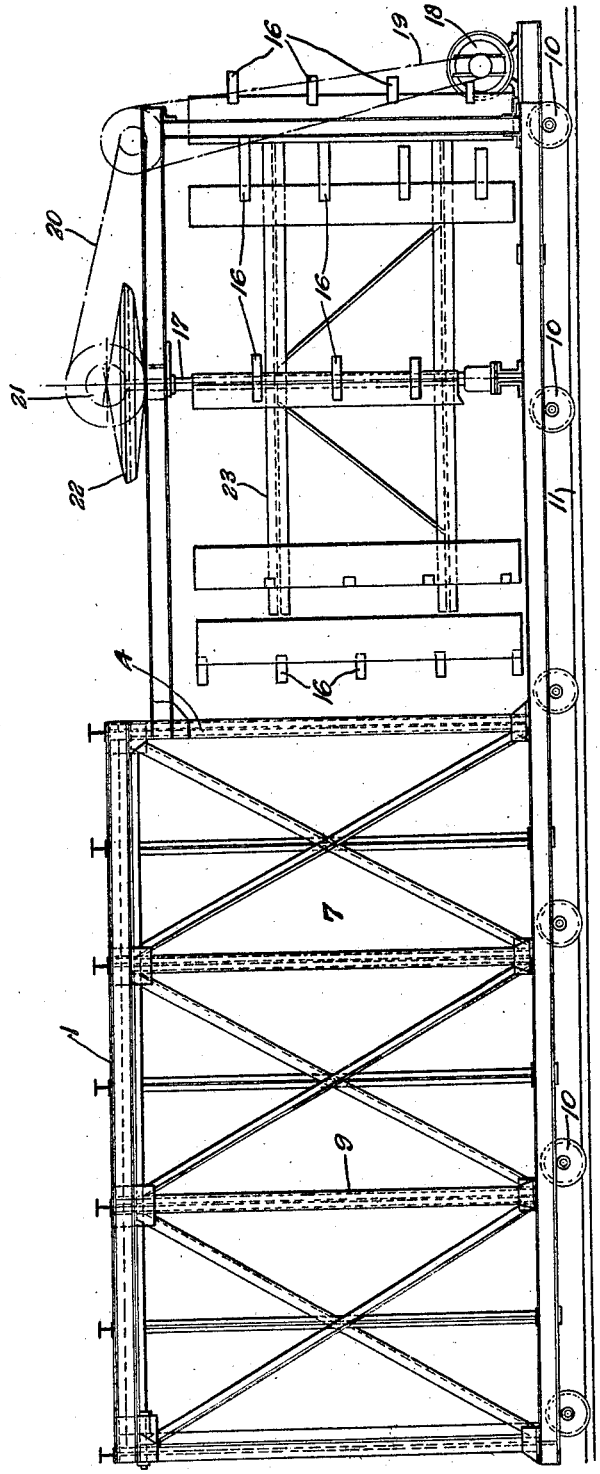

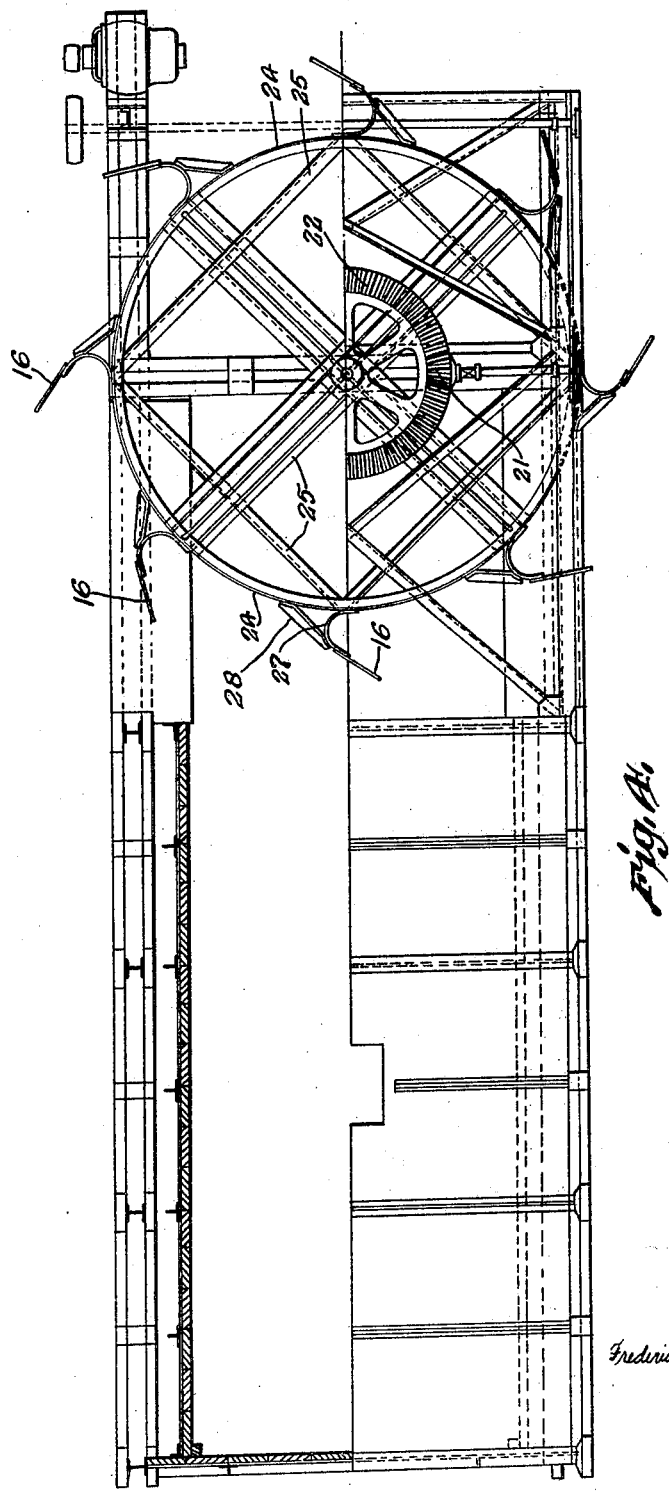

UNITED STATES PATENT OFFICE.

FREDERICK WILLIAM ROGERS WILLIAMS, OF LONDON, ENGLAND.

APPARATUS FOR USE IN THE MANUFACTURE OF SUPERPHOSPHATE.

1,398,350.

Specification of Letters Patent. Patented Nov. 29, 1921.

Application filed February 4, 1919. Serial No. 274,924.

*To all whom it may concern:*

Be it known that I, FREDERICK WILLIAM ROGERS WILLIAMS, a subject of the King of Great Britain, and resident of London, England, have invented certain new and useful Improvements in Apparatus for Use in the Manufacture of Superphosphate, of which the following is a specification.

This invention relates to an improved apparatus for use in the manufacture of superphosphate. The usual method of manufacturing superphosphate is to first mechanically mix the acid and phosphate thoroughly and then allow the mixture to flow into a truck like tank or reservoir where after a time it becomes a spongy mass. This mass is then disintegrated and removed from the truck by causing it to move relatively to rotating knives or cutters. The present invention has particular reference to the disintegrating process and consists of a particular construction and arrangement of the truck like reservoir and a particular construction and arrangement of the cutters designed to insure a rapid and effective operation.

Important features of the invention consist in the provision of the truck like reservoir open at the bottom, and coöperating with a stationary bed which serves to close it, and the provision of rotating cutters connected to and moving with the reservoir so that in operation the reservoir and the cutters move together and operate upon the phosphate block which remains stationary, cut superphosphate falling clear of the receding reservoir on to a conveyer whence it passes to the desired location.

In the accompanying drawings I have illustrated my invention.

Figure 1 being a side elevational view of the essential parts of a plant constructed in accordance with the invention.

Fig. 2 is a side elevational view of the truck like reservoir and its associated cutters to a somewhat larger scale.

Fig. 3 is a sectional end view thereof.

Fig. 4 is a plan view partly in section of Fig. 2.

Figs. 5 and 6 are plan and elevational views respectively illustrating one of the cutters in greater detail, and Figs. 7 and 8 are similar views illustrating another detail.

Referring to these drawings the numeral 1 designates the truck like reservoir having the usual opening 2 adapted to register with the hopper 3 for introducing the mixture of acid and phosphate. This reservoir is provided with a removable front wall 4 adapted to be secured in position by a suitable arrangement of bolts and nuts or wedges. A convenient arrangement which is illustrated in detail in Figs. 7 and 8 is to provide clamps 5 attached by angle irons 6 to the side walls 7 of the reservoir and provide wedges 8 adapted to coöperate with the clamps 5 to removably hold the front wall 4 in position. The side frames 9 of this reservoir are provided with wheels 10 adapted to run on rails 11, and the side walls 7 embrace a concrete bottom or flooring 12 which, of course, serves to close the reservoir to retain the superphosphate until the reaction has resulted in solidification. The side walls 7 are hinged at their upper edges as at 13 and are held in closed position by means of wedges 14 coöperating with clamps 15 and upon removal of the wedges 14 the side walls 7 fall away slightly about their hinges so as to be just free of the solidified superphosphate block. The reservoir has connected to it at the front a series of cutters 16 mounted to rotate upon a vertical axis 17 and motion is transmitted to these cutters through suitable gearing from a motor carried by and movable with the reservoir or otherwise, and an air blast or the like may be associated with the cutters as is usual in this type of apparatus. In the particular arrangement shown in the drawings, the cutters are driven from a motor 18 carried by the platform of the truck like reservoir 1, the motion being communicated at 19 and 20 to a bevel pinion 21 which gears with a bevel wheel 22 keyed upon the vertical shaft or axis 17. This vertical shaft carries a skeleton cutter drum 23 built up of hoops 24 and cross girders 25 and the cutters proper 16 are removably attached to vertical channel plates 27 attached to the drum hoops 24 and held rigid by stays or struts 28. The arrangement of the cutters 16 is preferably such that a number of cutting edges are located in different horizontal planes so that as the cutting mechanism revolves as a whole, each separate cutter cuts its own strip and the cutters at the top of the drum are in advance of or slightly longer than the cutters at the bottom so that the block is cut on an incline sloping downward from top to bottom as indicated in Fig. 1. The movable truck like reservoir 1 is provided with some form of mechanism such as screws, or a chain and pulley haulage mechanism, whereby it can be caused to move longitudinally. In the drawings a screw 29 is indicated driven by mechanism 30 driven from the pulley 31. This screw is supported in bearings 32 and coöperates with a nut 33 carried by the framing of the truck like reservoir 1 so that upon rotation of the screw 29 the truck-like reservoir together with the cutters is caused to move while the superphosphate block remains stationary upon the concrete bed 12. It will be understood that any suitable mechanism for effecting this movement of the truck-like reservoir and cutters relative to the block to be cut can be employed, the particular arrangement shown being given by way of example only. Beneath the reservoir a mechanical conveyer 34 may be and preferably is provided.

The operation of the apparatus is as follows:—After the superphosphate has reached the solid or spongy state the removable front wall 4 of the reservoir is removed by removing the wedges 8 and taking the said front wall away. The haulage or other mechanism for moving the truck like reservoir 1 longitudinally is set in motion as also is the cutting mechanism. The reservoir 1 then moves together with the cutters carried with it, while the superphosphate block remains stationary upon the concrete bed aforesaid, and in order that there shall be no tendency for the superphosphate block to move with the reservoir the side walls 7 of the reservoir are hinged at the top as beforementioned so as to be capable of being slightly moved to free them from engagement with the superphosphate block. This of course is effected by removing the wedges 14, the side walls 7 being so hinged that their natural tendency is to swing outward slightly about their hinges when the wedges 14 have been removed. Seeing that this superphosphate block remains stationary whereas the cutting apparatus moves with the reservoir or truck 1, it will be understood that the cutters 16, which as aforesaid, are revolving upon a vertical axis 17 will come into contact with the front face of the block into which they will cut continuously so that the block as a whole will be gradually cut or pared away and the cuttings will fall through openings on to the conveyer 34 and be carried to the desired location. The disintegrating apparatus will be combined in practice with the usual mixing apparatus and other adjuncts which go to form a complete plant for the manufacture and disintegration of the superphosphate.

What I claim and desire to secure by Letters Patent is:—

1. Apparatus for use in the manufacture and disintegration of superphosphate comprising a stationary bed for the reception of the block of superphosphate, a reservoir mounted upon a truck-like frame and adapted to reside above said stationary bed and inclose said block of superphosphate and also for movement above said block, a rotating cutter carried by said truck-like frame exterior to the reservoir whereby the movement of said frame effects removal of the reservoir from above the stationary bed and corresponding movement of the cutter toward the superphosphate block for the purpose of disintegrating the same.

2. Apparatus for use in the manufacture and disintegration of superphosphate comprising a movable truck-like reservoir having a removable front wall and closed at the bottom by a stationary bed into which reservoir the acid and phosphate are introduced so that after the reaction a block of superphosphate rests upon the stationary bed, rotatable cutters associated and movable with the truck-like reservoir, means for moving the truck-like reservoir and cutters bodily in a longitudinal direction, means for actuating the cutters whereby after the removal of the front wall of the reservoir the mechanism for moving and actuating the reservoir and cutters results in the cutters disintegrating the stationary block of superphosphate, and further means whereby the side walls of the reservoir may be removed.

3. Apparatus for use in the manufacture and disintegration of superphosphate comprising a movable truck-like reservoir having a removable front wall and closed at the bottom by a stationary bed into which reservoir the acid and phosphate are introduced so that after the reaction a block of superphosphate rests upon the stationary bed, rotatable cutters associated and movable with the truck-like reservoir, means for moving the truck-like reservoir, and cutters bodily in a longitudinal direction, means for actuating the cutters whereby after the removal of the front wall of the reservoir the mechanism for moving and actuating the reservoir and cutters results in the cutters disintegrating the stationary block of superphosphate, and means for removing the side walls of the reservoir consisting in hinging the same at the top so that when the securing means is released they tend to move clear of the block and offer no obstruction to the movement of the reservoir relative to the block.

In witness whereof I affix my signature.

FREDERICK WILLIAM ROGERS WILLIAMS.